(12) United States Patent
Tada

(10) Patent No.: US 9,518,173 B2
(45) Date of Patent: Dec. 13, 2016

(54) TIRE RUBBER COMPOSITION AND PNEUMATIC TIRE

(71) Applicant: SUMITOMO RUBBER INDUSTRIES, LTD., Kobe-shi, Hyogo (JP)

(72) Inventor: Toshio Tada, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 354 days.

(21) Appl. No.: 13/949,301

(22) Filed: Jul. 24, 2013

(65) Prior Publication Data

US 2014/0031489 A1    Jan. 30, 2014

(30) Foreign Application Priority Data

Jul. 25, 2012    (JP) .................................. 2012-164947

(51) Int. Cl.
| C08L 21/00 | (2006.01) |
| C08L 9/06 | (2006.01) |
| B60C 1/00 | (2006.01) |

(52) U.S. Cl.
CPC ................ C08L 9/06 (2013.01); B60C 1/0025 (2013.04); C08L 21/00 (2013.01)

(58) Field of Classification Search
CPC .................................... C08L 21/00; C08L 9/06
See application file for complete search history.

(56) References Cited

U.S. PATENT DOCUMENTS

| 2,731,060 A | 1/1956 | Rowe |
| 2,873,784 A | 2/1959 | Hawley |
| 2,889,307 A | 6/1959 | Clayton |
| 3,914,478 A * | 10/1975 | Johansson et al. ......... 427/393.5 |
| 4,602,052 A * | 7/1986 | Weber et al. .................. 523/215 |
| 6,699,924 B1 * | 3/2004 | Daude ................... B60C 1/0016 524/431 |
| 2006/0207700 A1 | 9/2006 | Palombo |
| 2007/0256771 A1 * | 11/2007 | Balogh et al. ................ 152/525 |
| 2008/0173381 A1 | 7/2008 | Joseph et al. |

FOREIGN PATENT DOCUMENTS

| EP | 0 476 470 A1 | 3/1992 |
| JP | 61-143454 A | 7/1986 |
| JP | 62-129324 A | 6/1987 |
| JP | 2-208337 A | 8/1990 |
| JP | 5-179067 A | 7/1993 |
| JP | 2002-309053 A | 10/2002 |
| JP | 2004-505149 A | 2/2004 |
| JP | 2008-174639 A | 7/2006 |
| JP | 2006-249406 A | 9/2006 |
| JP | 2008-174586 A | 7/2008 |
| JP | 2008-174588 A | 7/2008 |
| KR | 2000-0025487 A | 5/2000 |

OTHER PUBLICATIONS

Search Report date Oct. 23, 2013 of European Application No. 13 17 6005.

* cited by examiner

*Primary Examiner* — Peter D Mulcahy
(74) *Attorney, Agent, or Firm* — Birch, Stewart, Kolasch & Birch, LLP

(57) ABSTRACT

The present invention provides a tire rubber composition that makes it possible to suppress discoloration of tires, and a pneumatic tire formed from the rubber composition. The present invention relates to a tire rubber composition containing a bluing agent.

8 Claims, No Drawings

TIRE RUBBER COMPOSITION AND PNEUMATIC TIRE

TECHNICAL FIELD

The present invention relates to a tire rubber composition, and a pneumatic tire formed from the same.

BACKGROUND ART

Sidewall rubber compositions for tires contain antioxidants for preventing cracks from developing in sidewalls. However, such an antioxidant in a sidewall rubber migrates to the sidewall surface over time, and thus the antioxidant is oxidized at the surface, which causes the sidewall to turn yellow. Moreover, tire component rubbers, which contain many double bonds, have poor weather resistance, and therefore may turn yellow over time. Such sidewall yellowing causes an undesired appearance since tires are originally black due to carbon black. This problem should be overcome to maintain the commercial value of tires.

Patent Literature 1 discloses a method for suppressing migration of an antioxidant to the sidewall surface by using polyethylene glycol having a specific molecular weight. Still, there is a demand for other techniques.

CITATION LIST

Patent Literature

Patent Literature 1: JP-A H05-179067

SUMMARY OF INVENTION

Technical Problem

The present invention aims to solve the above problem and to provide a tire rubber composition that makes it possible to suppress discoloration of tires, and a pneumatic tire formed from the rubber composition.

Solution to Problem

The present invention relates to a tire rubber composition, containing a bluing agent.

The bluing agent is preferably a pigment or a dye.

The bluing agent is preferably present in an amount of 0.2 to 50 parts by mass per 100 parts by mass of a rubber component in the tire rubber composition.

The tire rubber composition is preferably for use as a sidewall rubber composition.

The present invention further relates to a pneumatic tire, formed from the tire rubber composition.

Advantageous Effects of Invention

The tire rubber composition according to the present invention, which contains a bluing agent, makes it possible to suppress discoloration of tires over time.

DESCRIPTION OF EMBODIMENTS

The tire rubber composition of the present invention contains a bluing agent.

As described above, tires are black due to carbon black. If the rubber surface partially undergoes yellowing over time, this change is very conspicuous and causes an undesired appearance. In the present invention, a bluing agent is already contained in a rubber composition to produce a complementary effect and thereby counteract discoloration of the rubber composition. Thus, the present invention makes it possible to suppress discoloration of tires over time. Additionally, it was demonstrated that the addition of a bluing agent did not degrade the performance required for sidewalls, and good flex crack growth resistance could be achieved.

Examples of a rubber component usable in the tire rubber composition include natural rubber (NR) and synthetic diene rubbers (e.g. isoprene rubber (IR), butadiene rubber (BR), styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), butyl rubber (IIR), and halogenated butyl rubber (X-IIR)). Any of these rubbers may be used alone, or two or more of these may be used in combination. In particular, SBR is preferred.

The rubber composition of the present invention contains a bluing agent. In the present invention, the bluing agent is not limited at all, as long as it can offset a yellow color, and the bluing agent may be, for example, a colorant that absorbs orange to yellow light to become blue to violet.

Examples of the bluing agent include inorganic dyes and pigments such as ultramarine blue, iron blue (Prussian blue (potassium ferric ferrocyanide)), and cobalt blue; and organic dyes and pigments such as phthalocyanine compounds, monoazo compounds, diazo compounds, azine compounds, triallylmethane compounds, and condensed polycyclic compounds (e.g. indigo compounds and anthraquinone compounds). In particular, ultramarine blue is preferred.

Specifically, typical examples of the bluing agent include Solvent Violet 13 (generic name) [CA. No. (Color Index No.) 60725; trade names: "MACROLEX Violet B" supplied by Bayer, "DIARESIN Blue G" supplied by Mitsubishi Chemical Corporation, "SUMIPLAST Violet B" supplied by Sumitomo Chemical Co., Ltd., "Plast Violet 8840" supplied by Arimoto Chemical Co., Ltd., "KP Plast Violet 2R" supplied by KIWA Chemical Industry. Co., Ltd., and "Quinizarin Blue" supplied by Tokyo Chemical Industry Co., Ltd.], Solvent Violet 31 (generic name) [CA. No. 68210; trade name: "DIARESIN Violet D" supplied by Mitsubishi Chemical Corporation"], Solvent Violet 33 (generic name) [CA. No. 60725; trade name: "DIARESIN Blue J" supplied by Mitsubishi Chemical Corporation"], Solvent Violet 94 (generic name) [CA. No. 61500; trade name: "DIARESIN Blue N" supplied by Mitsubishi Chemical Corporation"], Solvent Violet 36 (generic name) [CA. No. 68210; trade name: "MACROLEX Violet 3R" supplied by Bayer], Solvent Blue 97 (generic name) [trade name: "MACROLEX Blue RR" supplied by Bayer], Solvent Blue 45 (generic name) [CA. No. 61110; trade name: "Polysynthren blue RLS" supplied by Sandoz], "NBK-1035 blue" supplied by Nubiola, "Oil Black SF" supplied by Chuo synthetic Chemical Co., Ltd., "Oil Black 109" supplied by 3C Chuo synthetic Chemical Co., Ltd., "SUDAN Black 141" supplied by Chuo synthetic Chemical Co., Ltd., "NEO SUPER Black C-832" supplied by Chuo synthetic Chemical Co., Ltd., "OIL BLUE BA" supplied by Chuo synthetic Chemical Co., Ltd., and "OIL BLUE 8BN" supplied by Chuo synthetic Chemical Co., Ltd.

The colors of the discolored portions of yellowed tires, when evaluated using the L*a*b* color system, often satisfy $30<b^*<60$ and $-20<a^*<20$. Thus, the bluing agent preferably has a color complementary to such a color.

Specifically, when the color of the bluing agent is evaluated using the L*a*b* color system, the b* value preferably satisfies −60<b*<5, more preferably −60<b*<3.5, still more preferably −60<b*<3, and particularly preferably −60<b*<−30, and the a* value preferably satisfies −60<a*<5, and more preferably −60<a*<−30. When either the a* or b* value is in the above range, the bluing agent has a higher complementary effect and is more advantageous in suppressing discoloration of tires over time. When both the a* and b* values are in the above respective ranges, the bluing agent has a still higher complementary effect and is still more advantageous in suppressing discoloration of tires over time.

The sum a*+b* is preferably less than 5, more preferably not more than 4, still more preferably not more than 3.5, particularly preferably not more than 3.0, and most preferably not more than 2.5.

The L*a*b* color system is a system for expressing the color of an object, and was standardized by the International Commission on Illumination (CIE) in 1976. This L*a*b* color system is also defined in JIS Z-8729 in Japan. L* indicates lightness, and the pair of a* and b* represents hue and chroma. A larger L* value corresponds to higher lightness. The a* and b* indicate color directions: +a* is the red direction, −a* is the green direction, +b* is the yellow direction, and −b* is the blue direction.

The amount of the bluing agent, per 100 parts by mass of the rubber component, is preferably not less than 0.2 parts by mass, more preferably not less than 1 part by mass, and still more preferably not less than 3 parts by mass. If the amount is less than 0.2 parts by mass, the complementary effect of the bluing agent is likely to be too small to suppress discoloration of tires over time sufficiently. The amount is preferably not more than 50 parts by mass, more preferably not more than 25 parts by mass, and still more preferably not more than 15 parts by mass. If the amount is more than 50 parts by mass, then the performance required for sidewall rubbers (e.g. flex crack growth resistance and air barrier properties) may be reduced.

As described above, an antioxidant, when contained in a rubber composition, can be a cause of yellowing of tires. Antioxidants, such as heat resistant antioxidants and weather resistant antioxidants, commonly used in rubber compositions can be used without limitation in the rubber composition of the present invention, and examples thereof include amine antioxidants such as naphthylamine antioxidants (e.g. phenyl-α-naphthylamine), diphenylamine antioxidants (e.g. octylated diphenylamine and 4,4'-bis(α,α'-dimethylbenzyl) diphenylamine), and phenylenediamine antioxidants (e.g. N-isopropyl-N'-phenyl-p-phenylenediamine, N-(1,3-dimethylbutyl)-N'-phenyl-p-phenylenediamine, and N,N'-di-2-naphthyl-p-phenylenediamine); quinoline antioxidants such as 2,2,4-trimethyl-1,2-dihydroquinoline polymer; and phenolic antioxidants such as mono-phenolic antioxidants (e.g. 2,6-di-t-butyl-4-methylphenol and styrenated phenol), and bis-, tris-, poly-phenol antioxidants (e.g. tetrakis-[methylene-3-(3',5'-di-t-butyl-4'-hydroxyphenyl)propionate]methane). In particular, amine antioxidants (preferably phenylenediamine antioxidants) are preferred, and N-(1,3-dimethylbutyl)-N'-phenyl-p-phenylenediamine is more preferred.

The amount of the antioxidant is not limited at all, and is preferably 0.5 to 3 parts by mass, more preferably 0.5 to 2 parts by mass, and still more preferably 0.5 to 1.5 parts by mass, per 100 parts by mass of the rubber component.

In addition to the aforementioned ingredients, the tire rubber composition may contain compounding ingredients generally used in production of rubber compositions, such as reinforcing filler, a silane coupling agent, oil, stearic acid, zinc oxide, wax, a vulcanizing agent, and a vulcanization accelerator, as appropriate.

Any of silica, carbon black, calcium carbonate, aluminum hydroxide, clay, mica and the like may be used as reinforcing filler. Preferred reinforcing fillers are carbon black and silica, and carbon black is more preferred.

The total amount of such reinforcing filler(s) is not limited at all, and is preferably 10 to 150 parts by mass, and more preferably 30 to 90 parts by mass, per 100 parts by mass of the rubber component.

The rubber composition of the present invention can be prepared by commonly used methods. For example, the rubber composition can be prepared by a method including mixing and kneading the above-described ingredients with the use of a rubber kneader such as an open roll mill, a Banbury mixer, or an internal mixer, and then vulcanizing the mixture.

The rubber composition of the present invention can be suitably used as a sidewall rubber composition, yellowing of which is likely to become a problem.

The pneumatic tire of the present invention can be produced from the rubber composition by commonly used methods. Specifically, before vulcanization, the rubber composition with various additives incorporated as necessary, is extruded and processed into the shape of a component such as a sidewall, and then arranged and assembled with other tire components by a commonly used method in a tire building machine to form an unvulcanized tire. This unvulcanized tire is then heated and pressed in a vulcanizer, whereby a tire can be produced.

The pneumatic tire of the present invention can be suitably used for passenger vehicles, trucks and buses, two-wheeled vehicles, racing vehicles, and the like.

EXAMPLES

The present invention will be described in detail referring to, but not limited to, examples.

The following will describe the chemicals used in Examples and Comparative Example.

SBR: Sumitomo SE2148 (S-SBR) (available from Sumitomo Chemical Co., Ltd.)

Carbon black: DIABLACK I (ISAF, $N_2SA$: 114 $m^2/g$) (available from Mitsubishi Chemical Corporation)

Stearic acid: Stearic acid beads, Tsubaki (available from NOF Corporation)

Zinc oxide: Zinc oxide #2 (available from Mitsui Mining & Smelting Co., Ltd.)

Antioxidant: Santoflex 13 (N-(1,3-dimethylbutyl)-N'-phenyl-p-phenylenediamine) (available from Flexsys)

Wax: Ozoace 0355 (available from Nippon Seiro Co., Ltd.)

Sulfur powder: 5% oil-treated sulfur powder (soluble sulfur, oil content: 5% by mass) (available from Tsurumi Chemical Industry Co., Ltd.)

Vulcanization accelerator: NOCCELER CZ (N-cyclohexyl-2-benzothiazyl sulfenamide) (available from Ouchi Shinko Chemical Industrial Co., Ltd.)

Bluing agent 1: NBK-1035 blue (ultramarine (pigment)) (available from Nubiola)

Bluing agent 2: Oil Black SF (organic dye (nigrosine based azine dye)) (available from Chuo synthetic Chemical Co., Ltd.)

Bluing agent 3: Oil Black 109 (organic dye (nigrosine based azine dye)) (available from Chuo synthetic Chemical Co., Ltd.)

Bluing agent 4: SUDAN Black 141 (organic dye (diazo dye)) (available from Chuo synthetic Chemical Co., Ltd.)

Bluing agent 5: NEO SUPER Black C-832 (organic dye (tri-valent chrome type dye)) (available from Chuo synthetic Chemical Co., Ltd.)

Bluing agent 6: OIL BLUE BA (anthraquinone dye) (available from Chuo synthetic Chemical Co., Ltd.)

Bluing agent 7: OIL BLUE 8BN (organic dye (basic dye)) (available from Chuo synthetic Chemical Co., Ltd.)

Examples and Comparative Example

The chemicals in amounts shown in Table 1, except the sulfur and vulcanization accelerator, were mixed and kneaded in a 1.7-L Banbury mixer. Next, the sulfur and vulcanization accelerator were added to the kneaded mixture, and they were mixed with an open roll mill to give an unvulcanized rubber composition. The unvulcanized rubber composition was then press-vulcanized in a 2-mm-thick mold at 170° C. for 15 minutes to give a vulcanized rubber composition (vulcanized rubber sheet).

The vulcanized rubber compositions thus obtained were evaluated as described below. Table 1 shows the results.

(Measurement of a* and b*)

The vulcanized rubber compositions obtained as above were measured for a* and b* in accordance with JIS Z-8729, using a chroma meter, CR-400 (available from Konica Minolta, Inc.).

(Accelerated Discoloration Test)

The vulcanized rubber compositions obtained as above were subjected to an accelerated discoloration test using a xenon arc lamp (available from Suga Test Instruments Co., Ltd.) at a black panel temperature of 63° C. for 500 hours. The vulcanized rubber compositions were visually observed and evaluated for the degree of yellowing.

Good: no yellowing was observed.

Poor: yellowing was observed.

(Flex Crack Growth Resistance Test)

Samples were prepared from the vulcanized rubber compositions obtained as above, and subjected to a flex crack growth test in accordance with JIS K-6260 "Rubber, vulcanized or thermoplastic-Determination of flex cracking and crack growth (De Mattia type)". In the test, each rubber sheet sample was elongated 70% repeatedly 1,000,000 times for flexion, and then the length of generated cracks was measured. Those giving results equivalent to that of Comparative Example 1 were evaluated as "good" (indicated as "good" in the table).

TABLE 1

|  |  | Comparative Example 1 | Example 1 | Example 2 | Example 3 | Example 4 | Example 5 | Example 6 | Example 7 | Example 8 | Example 9 |
|---|---|---|---|---|---|---|---|---|---|---|---|
| Amount (part(s) by mass) | SBR | 100 | 100 | 100 | 100 | 100 | 100 | 100 | 100 | 100 | 100 |
|  | Carbon black | 50 | 50 | 50 | 50 | 50 | 50 | 50 | 50 | 50 | 50 |
|  | Stearic acid | 2 | 2 | 2 | 2 | 2 | 2 | 2 | 2 | 2 | 2 |
|  | Zinc oxide | 3 | 3 | 3 | 3 | 3 | 3 | 3 | 3 | 3 | 3 |
|  | Antioxidant | 1 | 1 | 1 | 1 | 1 | 1 | 1 | 1 | 1 | 1 |
|  | Wax | 1 | 1 | 1 | 1 | 1 | 1 | 1 | 1 | 1 | 1 |
|  | Sulfur powder | 1.6 | 1.6 | 1.6 | 1.6 | 1.6 | 1.6 | 1.6 | 1.6 | 1.6 | 1.6 |
|  | Vulcanization accelerator | 1 | 1 | 1 | 1 | 1 | 1 | 1 | 1 | 1 | 1 |
|  | Bluing agent 1 | — | 5 | 10 | 15 | — | — | — | — | — | — |
|  | Bluing agent 2 | — | — | — | — | 0.3 | — | — | — | — | — |
|  | Bluing agent 3 | — | — | — | — | — | 0.3 | — | — | — | — |
|  | Bluing agent 4 | — | — | — | — | — | — | 0.3 | — | — | — |
|  | Bluing agent 5 | — | — | — | — | — | — | — | 0.3 | — | — |
|  | Bluing agent 6 | — | — | — | — | — | — | — | — | 0.3 | — |
|  | Bluing agent 7 | — | — | — | — | — | — | — | — | — | 0.3 |
| Evaluation results | a* | 0.6 | 0 | 0 | 0 | 0 | 0 | 0 | 0 | 0 | 0 |
|  | b* | 2 | −0.3 | −0.4 | 0.5 | −0.3 | −0.3 | −0.3 | −0.3 | −0.3 | −0.3 |
|  | Yellowing | Poor | Good | Good | Good | Good | Good | Good | Good | Good | Good |
|  | Flex crack growth resistance | Good | Good | Good | Good | Good | Good | Good | Good | Good | Good |

As seen in Table 1, the examples each using a bluing agent could suppress discoloration of tires over time.

The invention claimed is:

1. A tire rubber composition comprising a rubber component, a bluing agent and carbon black,
   wherein the bluing agent is at least one member selected from the group consisting of inorganic dyes and pigments, and
   wherein the carbon black is present in an amount of 10 to 150 parts by mass, per 100 parts by mass of the rubber component in the tire rubber composition.

2. The tire rubber composition according to claim 1, further comprising styrene-butadiene rubber and an antioxidant,
   wherein a b* value of the bluing agent satisfies −60<b*<5 and an a* value of the bluing agent satisfies −60<a*<5.

3. The tire rubber composition according to claim 1, wherein the bluing agent is present in an amount of 0.2 to 50 parts by mass per 100 parts by mass of a rubber component in the tire rubber composition.

4. The tire rubber composition according to claim 1, wherein the tire rubber composition is for use as a sidewall rubber composition.

5. A pneumatic tire, formed from the tire rubber composition according to claim 1.

6. A tire rubber composition which suppresses the discoloration of tires and does not degrade the performance of the flex crack growth resistance of the tires, which comprises a rubber component, a bluing agent and carbon black, wherein the bluing agent is at least one member selected from the group consisting of inorganic dyes and pigments, and wherein the carbon black is present in an amount of 10 to 150 parts by mass, per 100 parts by mass of the rubber component in the tire rubber composition.

7. The rubber composition of claim 6, wherein the bluing agent is present in an amount of 0.3 to 15 parts by mass per 100 parts by mass of the rubber component in the rubber composition.

8. The tire rubber composition according to claim 1, wherein the carbon black is present in an amount of 30 to 150 parts by mass, per 100 parts by mass of the rubber component in the tire rubber composition.

* * * * *